Feb. 24, 1970  A. S. DAMICO  3,497,871
ALERTING SIGNAL SYSTEM FOR INDICATING THE OPERATING
CONDITION OF MOTOR VEHICLES
Filed Sept. 12, 1966  2 Sheets-Sheet 1
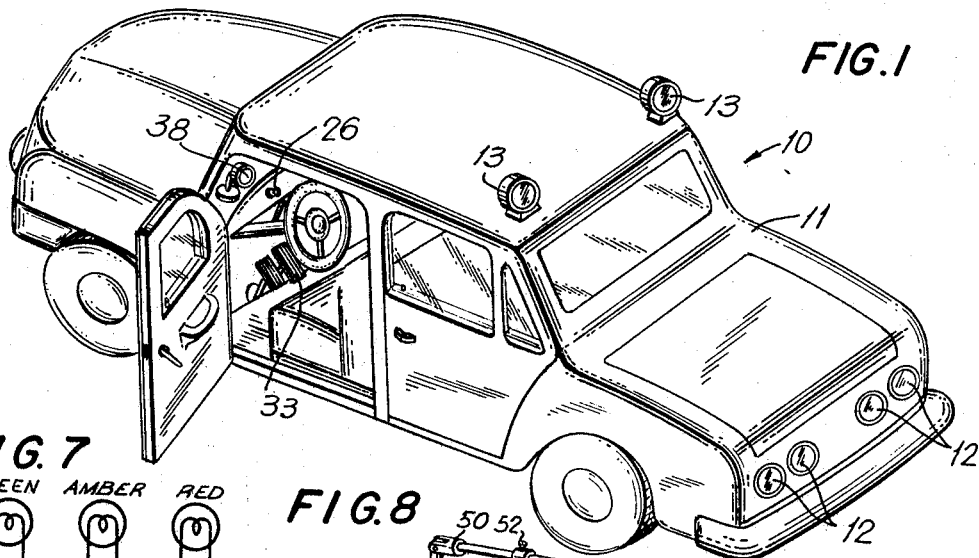
FIG.1
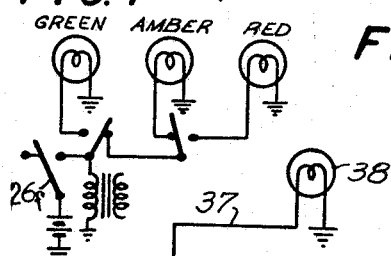
FIG.7
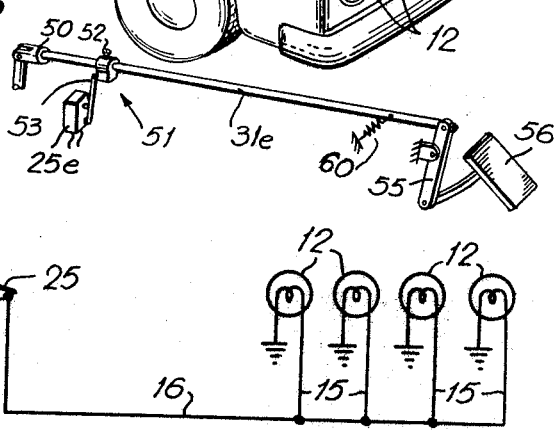
FIG.8
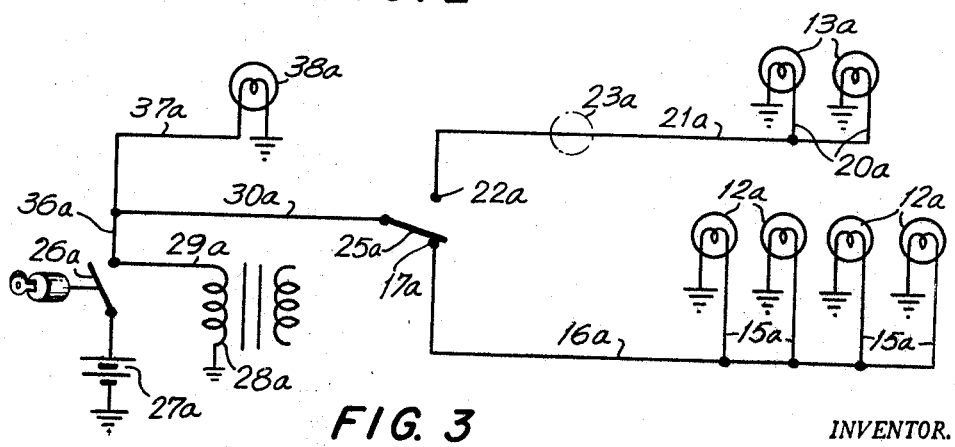
FIG. 2
FIG. 3
INVENTOR.
ARMAND S. DAMICO
BY
Percy Freeman
ATTORNEY INVENTOR.
ARMAND S. DAMICO
BY Percy Freeman
ATTORNEY

United States Patent Office 3,497,871
Patented Feb. 24, 1970

3,497,871
ALERTING SIGNAL SYSTEM FOR INDICATING THE OPERATING CONDITION OF MOTOR VEHICLES
Armand S. Damico, 65—15 79th Place, Middle Village, N.Y. 11379
Filed Sept. 12, 1966, Ser. No. 578,764
Int. Cl. B60q 1/26
U.S. Cl. 340—71                      13 Claims

ABSTRACT OF THE DISCLOSURE

The present invention pertains to an alerting signal system for indicating the operating condition of a motor vehicle to apprise drivers rearwardly of the vehicle of the condition and actions of the vehicle and comprises utilizing the existing tail illuminating lights or lamps and other lamps to indicate the operating condition of the vehicle and any changes thereof.

---

This invention relates generally to signal systems for automotive vehicles, and is especially concerned with a unique and highly improved signal system for alerting drivers in the vicinity of other vehicles concerning the presence thereof and the contemplated action of vehicles being observed.

As is well known to those versed in the art, existing automotive signal systems have proved entirely inadequate in present-day conditions of high speed and congested traffic. That is, automotive improvements in higher speed, greater power, ease of operation, and others, have served only to add to traffic problems and create higher numbers of accidents. An important reason for the high accident rate is the absence of adequate signaling between vehicles, whereby a driver may obtain more early warning of the action of a proximate vehicle.

For example, present vehicle signaling systems do not even communicate whether the engine of a particular vehicle is running, much less whether the vehicle is moving or standing still. Even conventional tail lights are ineffective in communicating to an adjacent rearward driver that acceleration has decreased, unless braking action has actually been applied. At highway speeds, instantaneous communication of this type between adjacent drivers is essential to the minimizing of accidents.

Accordingly, it is an important object of the present invention to provide a signaling system for automotive vehicles which effectively alerts drivers of adjacent vehicles to the condition and potential action of a vehicle carrying the instant alerting system.

It is a more particular object of the present invention to provide an alerting signaling system for automotive vehicles where in the mere turning on or closing of the ignition switch is indicated to adjacent drivers, and wherein the incipient deceleration resulting from deactuation of the carburetor is instantaneously communicated to adjacent drivers, as well as to pedestrians in the rear of said vehicle, and wherein alternate actuation and deactuation of the acceleration mechanism is most attractively signaled to adjacent drivers, because of the illusion of a moving light or of flashing lights as requiring most attention.

The instant invention more particularly contemplates the provision of signal means for automotive vehicles effectively signaling to adjacent drivers that the motor is running or should be running, as well as providing incidental advantages in signaling to a car owner that the ignition key had not been removed when the car is stopped whether the motor is inadvertently left running or is not running, thus preventiing the accidental or deliberate operation of a vehicle without tail or rear lights in violation of the law, as well as accidental death by asphyxiation, as in a domestic garage or adjacent residence.

It is still a further object of the present invention to provide an automotive signaling system having the advantageous characteristics mentioned in the preceding paragraphs which is extremely simple in construction, durable and reliable throughout a long useful life, and which can be economically manufactured and installed for sale at a reasonable price.

Other objects of the present invention will become apparent upon reading the following specification and referring to the accompanying drawings, which form a material part of this disclosure.

In the drawings:

FIGURE 1 is a rear perspective view showing an automotive vehicle incorporating an embodiment of the signaling system of the instant invention.

FIGURE 2 is a schematic representation of an automotive signaling system in accordance with the teachings herein.

FIGURE 3 is a schematic representation of a further embodiment of automotive signaling system in accordance with the present invention.

FIGURE 7 is a schematic representation of a signaling system.

FIGURE 8 is a diagrammatic view of a switch actuating mechanism.

Figure 4:
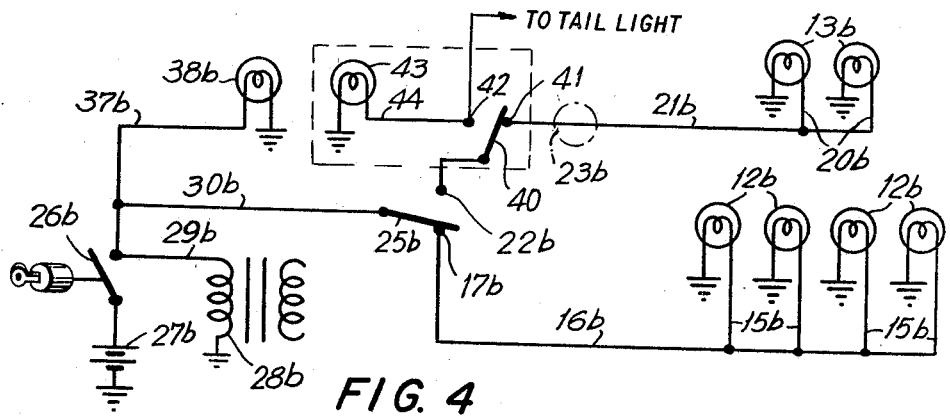
FIGURE 4 is a schematic representation of a further embodiment of automotive signaling system of the present invention.

Referring now more particularly to the drawings, a vehicle is generally designated 10 in FIGURE 1 and includes a body 11 provided at its rear end with a plurality of lights 12, which are the conventional brake or stop lights. In addition, one or more lights 13 are shown, advantageously at an elevated location relative to the lights 12, exteriorly of the body 11 or interiorly thereof, say on the rear speaker deck, or elsewhere, as desired.

The lights 12 and 13 are all advantageously arranged to face rearwardly, as for alerting adjacent rearward drivers and pedestrians, and are preferably spaced vertically, say to distinguish the signals thereof.

In FIG. 2, the lamps 12 may each be connected on one side to ground, and respectively connected on the other side by conductors 15 to a conductor 16, which is in turn connected to a switch contact 17. A microswitch arm or movable member 25 is swingable between a closed position engaging contact 17 and an open position spaced from the latter contact, and actuated by the carburetor mechanism or gas pedal 56, as shown in FIG. 8. The switch member 25 is connected by a conductor 30, and thence a conductor 36 to one side of an ignition switch 26. The other side of the ignition switch may be connected to a battery 27, and the ignition switch may be key-operated in the conventional manner. The conductor 36 is also connected to the ignition coil 28 by a conductor 29, so that the coil may be energized upon closure of the ignition switch 26, in the conventional manner. A conductor 37 may be connected at one end to the juncture of conductors 30 and 36, and connected at its other end to one side of a pilot lamp 38, which may be grounded on its other side. Thus, closure of the ignition switch 26 as indicated by energization of the pilot lamp 38, and energization of the lamps 12 is effected by operation of the accelerator mechanism or carburetor linkage to actuate switch member 25.

In the schematic diagram of FIGURE 3, the lamps 12a are each illustrated as connected on one side by conductors 15a, which are in turn connected by a conductor 16a to a switch contact 17a. The lamps 12a may be connected on their other side to ground.

The lamps 13a may each be similarly connected on one side to a conductor 20a, which are in turn connected by a conductor 21a to another switch contact 22a. A flasher 23a may optionally be connected in the conductor 21a, if desired.

The switch contacts 17a and 22a may be fixed, and cooperate with a movable switch element or blade 25a to define a single-pole double-throw snap action microswitch. That is, the switch element, blade or arm 25a is swingable between alternative positions in electrical engagement with one or the other of contacts 17a and 22a. The single-pole, double-throw switch 25a is advantageously of only a two-position type, either closed at contact 17a or closed at contact 22a. Further, the normal position of the switch element 25a is as illustrated in FIGURE 2, namely closed in engagement with contact 17a, for purposes appearing presently.

The vehicle 10 conventionally includes an ignition switch, as at 26a, which is connected in series between an electric supply source or battery 27a and an ignition coil 28a, as by a conductor 29a. The movable switch element or arm 25a is electrically connected, as by a conductor 30a, and a conductor 36a to the conductor 29a, so that the arm 25a is energized or hot upon closure of the ignition switch 26a.

The movable switch element or arm 25 is actuated by the conventional acceleration mechanism of vehicle 10, as in FIGURE 8. The accelerator mechanism may be shiftable for actuating the movable switch element 25a between electrical connection with contact 17a, as illustrated, and electrical contact with contact 22a. In the normal, illustrated condition of switch element 25a engaging contact 17a, the accelerator mechanism is at rest or de-actuated condition, say when the engine is idling or the vehicle is coasting.

A pilot lamp 38a is connected on one side to ground, and connected on its other side by a conductor 37a to the juncture of conductors 36a and 30a.

In operation, upon closure of the ignition switch 26a, as the first step in operation of the vehicle, electrical circuits are closed through conductor 29a to coil 28a and through conductors 30a, switch element 25a, contact 17a, conductors 16a and 15a, to lamps 12. Thus, the lamps 12 are energized immediately upon closure of the ignition switch 26. This, of course, indicates that the engine is running, or should be running.

A circuit is also closed through ignition switch 26a, conductors 36a and 37a and lamp 38a, to indicate visually the closure of the ignition switch. Thus, illumination of pilot lamp 38a indicates the vehicle key remains in the ignition switch and the switch remains on.

Upon further operation, the accelerator mechanism is operated, as by depression of the accelerator pedal, to shift switch element 25a into closing engagement with contact 22a. This closes an electrical circuit through contact 22a, conductors 21a and 20a, to lamps 13a and indicates a condition of acceleration or steady speed. Immediately upon release of the accelerator pedal, the switch element 25a returns to its illustrated position in FIGURE 3, to deenergize the lamps 13a and again energize the lamps 12a. Hence, immediately upon incipient deceleration, without the delay inherent in operation of the brakes, a signal is communicated to rearward drivers. Of course, alternate energization of lamps 12a and 13a indicates an erratic vehicle operation and provides an attention-arresting signal for alerting drivers in the vicinity.

In the embodiment of FIGURE 4, there are provided the lamps 12b each connected on one side to ground and connected on the other side by the conductors 15b to a conductor 16b which is connected to a contact 17b of a snap-action microswitch 25b. Lamps 13b are connected on one side to ground, and each connected on its other side by a conductor 20b to a conductor 21b. Connected in the conductor 21b, in series therewith, may optionally be a flasher unit 23b.

The ignition switch 26b is connected in series with the battery or source of electrical supply 27b, and a fixed contact of the ignition switch is connected by a conductor 29b to an ignition coil 28b. Also connected to the fixed contact of ignition switch 26b is a conductor 36b, which is connected to a conductor 30b, in turn connected to the arm or blade of snap-action microswitch 25b. The microswitch 25b is arranged for actuation by the accelerator mechanism or carburetor linkage.

A pilot lamp 38b is connected on one side to ground and on its other side by a conductor 37b to the juncture of conductors 30b and 36b.

As thus far dscribed, the embodiment of FIGURE 4 is essentially similar to that of FIGURE 3. However, the embodiment of FIGURE 4 includes a switch 40 having a contact 41 connected in series between the flasher unit 23b and switch contact 22b. The switch 40 also includes a contact 42, the arm of switch 40 being selectively shiftable between engagement with respective contacts 41 and 42. In the illustrated condition, the switch 40 is closed to contact 41 and operates in the same manner as described in connection with FIGURE 3.

However, an additional pilot lamp 43 has one side grounded and its other side connected by a conductor 44 to the contact 42. Thus, the pilot lamp may be closed to current through switch arm 40 upon engagement of the latter with contact 42, providing an indication of the inoperative condition of lamps 13b, say in states where such lamps are not permitted; in such case the rear of the vehicle must have a stop or tail light in any event, a lead from contact 42 would connect to other tail lights (not shown) so that the vehicle would not be operated in violation of the law.

Figure 5:
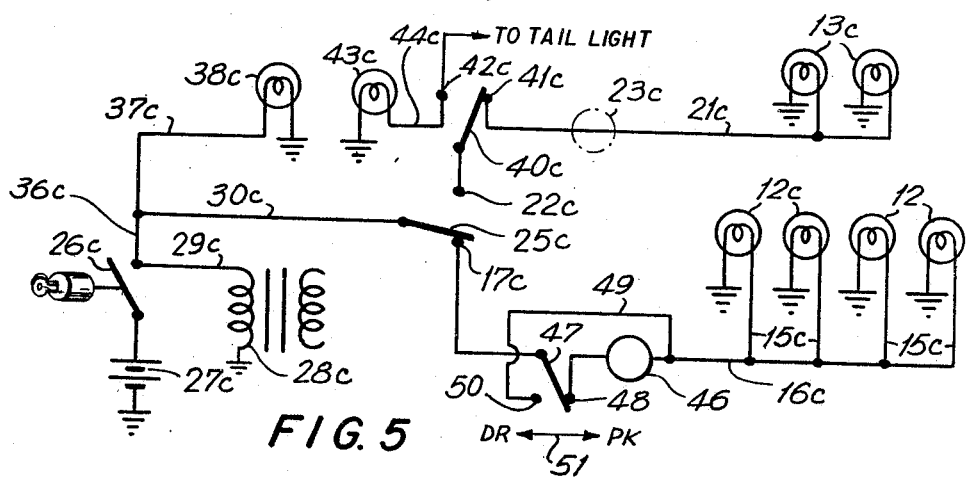
FIGURE 5 is a schematic representation of still a further embodiment of automotive signaling system in accordance with the teachings herein.

The embodiment of FIGURE 5 is generally similar to that of FIGURE 4, with certain exceptions. As shown in FIGURE 5, there are one or more lamps 12c each connected on one side to ground and on the other side by a conductor 15c to a conductor 16c. Also, there are provided one or more lamps 13c each connected on one side to ground and on the other side by a conductor 20c to a conductor 21c, having connected in series therewith a flasher unit 23c. A single-pole double-throw switch 40c includes a fixed contact 41c connected to the conductor 21c, and a fixed contact 42c connected by a conductor 44c to an additional pilot lamp 43c. The arm or blade of switch 40c is connected to a contact 22c of snap-action microswitch 25c. The blade of switch 25c is connected by a conductor 30c, and thence through a conductor 36c to the ignition switch 26c, which is in turn connected to a battery 27c. The ignition coil 28c is connected by a conductor 29c to the conductor 36c for energization upon closure of the ignition switch. The pilot lamp 38c may have one side connected to ground and its other side connected by a conductor 37c to the juncture of conductors 30c and 36c. As thus far described, the embodiment of FIGURE 5 may be essentially identical to that of FIGURE 4. However, connected in the conductor 16c may be a flasher unit 46, and a switch arm 47 swingable between open and closed relation with a fixed contact 48. In addition, a by-pass conductor 49 may be connected between a fixed contact 50 and the distal side of flasher unit 46. By this arrangement, the switch arm 47 in its illustrated condition energizes the flasher unit 46 to operate the lamps 12c in a flashing manner. Upon swinging movement of the switch arm 47 to engagement with contact 50, the flasher unit 46 is by-passed, for operation in the same manner as the embodiment of FIGURE 4. Further, the switch arm 47 is optionally actuated by the transmission mechanism of the vehicle for movement therewith, being in closed relation with contact 48 in the park condition of the vehicle, and in closed condition with contact 50 in the drive condition of the vehicle, as illustrated by arrow 51. Thus, in the park condition the flasher unit 46 is operative, while being inoperative in the drive condition.

Figure 6:
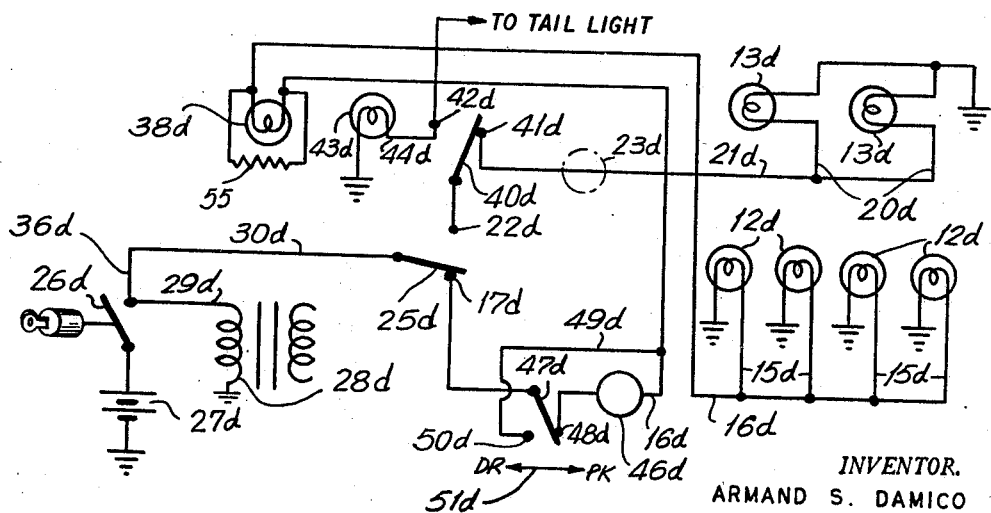
FIGURE 6 is a schematic representation of a further modification of an automotive signaling system of the present invention.

Referring now to embodiment of FIGURE 6, there are illustrated one or more lamps 12d each connected on one side to ground and on the other side by a conductor 15d to a conductor 16d. One or more lamps 13d are similarly each connected on one side to ground and on the other side by a conductor 20d to a conductor 21d. Optionally interposed in the conductor 21d may be a flasher 23d and a single-pole double-throw switch 40d may be connected between the flasher unit 23d and the fixed contact 22d of snap-action microswitch 25d. An additional pilot lamp 43d may be connected by a conductor 44d to contact 42d of switch 40d in the same manner as shown in FIGURES 4 and 5.

The switch 25d may be connected through a conductor 30d and a conductor 36d to the ignition switch 26d and by an additional conductor 29d to an ignition coil 28d.

Connected in series in the conductor 16d, in the same manner as illustrated in FIGURE 5, is an optional flasher unit 46d and a flasher by-pass conductor 49d including a single-pole double-throw switch 47d which may be operable responsive to shifting of the transmission between drive and park conditions.

The embodiment of FIGURE 6 provides a pilot light 38d connected in series in the conductor 16d between the lamps 12d and flasher by-pass conductor 49d. In parallel with the pilot lamp 38d is a shunt or load 55 of a size to balance the load of the lamps 12d. Thus, the pilot lamp 38d in the embodiment of FIGURE 6 is in series with the several signal lamps 12d to indicate proper operation thereof, while the shunt 55 protects the pilot lamp 38d and permits proper current drain by the lamps 12d.

In FIGURE 7, there is shown a modification of the signal device of my patent No. 1,880,849. However, in the instant alerting invention system, the yellow caution light or signal is intentionally dropped out since it serves no useful purpose and drops the safety factor back to the eixsting brake light era, since the brake must be applied for the stop signal. The brake pedal light circuit is also intentianally dropped out in order to make this device fully automatic—a sort of dead-man control, and give the signal of its intended action before it takes place with no action being required of the driver. The switch 26f of FIGURE 7 corresponds to the ignition switches of the previously described embodiments, and illustrates operation in conjunction with different colored lights.

Switch 25, as used in all embodiments of the invention, is a microswitch, such as is generally designated 25e in FIGURE 8, located proximate to a control arm or link 31e connected as by a clevis or other suitable means 50 to the carburetor for controlling vehicle speed. An actuating member generally designated 51 is carried by the link or arm 31e and selectively adjustably positionable along the arm, as by a set screw 52. The actuator 51 is thus movable with the arm 31e into and out of engagement with the operating arm 53 of the microswitch 25e, thereby effecting operation of the microswitch upon actuation of the carburetor. The microswitch 25e is normally closed and held open by the actuating member 51 under tension of spring 60 in the rest or non-operating condition of the carburetor, and may be released and thereby closed upon operation of the accelerator.

Also shown in FIGURE 8, the other end of arm 31e is connected to one end of a pivoted lever 55. Connected to the other end of the pivoted lever 55 may be suitable actuating means, such as a foot pedal 56, or the like.

From the foregoing, it is seen that the present invention provides a unique and greatly improved automotive signaling system which fully accomplishes its intended objects and is well adapted to meet practical conditions of manufacture, installation, maintenance and use, and which can be attached to any part of the gas accelerator linkage, or built into the gas pedal or into the carburetor, etc.

What is claimed is:

1. In combination, an automotive vehicle including an ignition switch and acceleration mechanism, and an alerting signal system comprising at least first and second pairs of rearwardly facing lamps carried by said vehicle in separate first and second pairs of housings, said first pair of lamps being the normal brake or stop lamps, said second pair of lamps being the normal tail illuminating lamps, a pair of switch contacts each electrically connected to a pair of respective lamps, and a movable switch element electrically connected to said ignition switch and movable between alternative electrical connection with respective switch contacts, said movable switch element being normally in one position of its alternative electrical connection and actively associated with said accelerator mechanism for movement therewith to the other position of its alternatice electrical connection, whereby said first pair of lamps is energized upon closure of said ignition switch and the second pair of lamps is alternatively energized upon operation of said accelerator mechanism.

2. The combination according to claim 1, said movable switch element and contacts comprising a single-pole double-throw snap-action microswitch.

3. The combination according to claim 1, said movable switch element being in said one position when said accelerator mechanism is in its rest position, and said movable switch element being in its other position when said accelerator mechanism is actuated, to insure alternative connection of said movable switch element with said switch contacts.

4. The combination according to claim 1, in combination with flasher means connected to at least one pair of said lamps.

5. The combination according to claim 1, said first pair of lamps having their respective contacts electrically connected to said movable switch element when said accelerator mechanism is at rest, to provide an alerting signal upon deactuation of said accelerator mechanism.

6. The combination according to claim 5, said second pair of lamps being spaced from said first pair of lamps and having their respective contacts electrically connected to said movable switch element when said acceleration mechanism is actuated, to provide a running signal and combining with said first pair of lamps to define an alerting signal upon alternative actuation and deactuation of said accelerator mechanism.

7. The combination according to claim 1, in combination with a pilot light connected to said ignition switch for indicating the condition thereof.

8. The combination according to claim 1, in combination with flasher means connected to at least one of said pairs of lamps, a by-pass conductor connected around said flasher means, and a by-pass switch in said by-pass conductor for selectively employing said flasher means.

9. In combination, an automotive vehicle including an ignition switch and acceleration mechanism, and an alerting signal system comprising at least a pair of rearwardly facing lamps carried by said vehicle, a pair of switch contacts each electrically connected to a respective lamp, and a movable switch element electrically connected to said ignition switch and movable between alternative electrical connection with respective switch contacts, said movable switch element being normally in one position of its alternative electrical connection and actively associated with said accelerator mechanism for movement therewith to the other position of its alternative electrical connection, whereby one of said lamps is energized upon closure of said ignition switch and the other lamp is alternatively energized upon operation of said accelerator mechanism, flasher means connected to at least one of said lamps, a by-pass conductor connected around said flasher means, a by-pass switch in said by-pass conductor, and said by-pass switch being connected to the vehicle transmission for actuation and deactuation of said flasher means responsive to vehicle park and drive condition.

10. The combination according to claim 9 in combination with a pilot light connected in series with said one lamp and said flasher means for indicating operation of the latter.

11. The combination according to claim 10, in combination with a shunt connected across said pilot lamp to balance the load of said one lamp.

12. The combination according to claim 1, in combination with flasher means connected to at least one of said pairs of lamps, switch means connected in circuit with said flasher means and said one pair of lamps to selectively deactuate the same, and a second pilot light connected to said last-mentioned switch means for actuation responsive to deactuation of said flasher means and said one pair of lamps.

13. The combination according to claim 6, wherein said second pair of lamps are disposed at a higher elevation than said first pair of lamps.

References Cited
UNITED STATES PATENTS

| | | | |
|---|---|---|---|
| 2,275,695 | 3/1942 | Stafford | 340—66 |
| 2,750,578 | 6/1956 | Petrella et al. | 340—66 |
| 2,760,113 | 8/1956 | Danek | 340—71 XR |
| 3,395,388 | 7/1968 | Hendrickson | 340—66 XR |

ALVIN H. WARING, Primary Examiner

U.S. Cl. X.R.

200—61.89, 86.5; 340—262